Sept. 7, 1943.   H. B. WEBSTER   2,328,762
APPARATUS FOR MEASURING CHARTS
Filed Oct. 27, 1941

INVENTOR
Hugh B. Webster
By _____
ATTORNEY

Patented Sept. 7, 1943

2,328,762

UNITED STATES PATENT OFFICE 2,328,762

APPARATUS FOR MEASURING CHARTS

Hugh B. Webster, Oakland, Calif., assignor to Standard Oil Company of California, San Francisco, Calif., a corporation of Delaware Application October 27, 1941, Serial No. 416,735

1 Claim. (Cl. 33—125)

This invention relates to an apparatus for measuring linear distances on a chart or the like on which is traced a record or marking of a variable quantity, such as pressure, compared with time, and particularly refers to a device for measuring distances on charts from pressure recorders for deep wells, such as those of the Marx Patent No. 1,955,855.

Charts which are utilized by certain types of condition responsive apparatus are not susceptible of previous calibration so that they cannot be printed or ruled beforehand and, after the record is made, have their numerical values read directly or by interpolation between the ruled lines. Certain types of pressure responsive instruments that are used in deep wells, for example that of the Marx Patent No. 1,955,855, may be made with interchangeable springs so that a given linear distance given on the chart with one spring has no relation to the same linear distance with a spring of different force or pressure responsive characteristics. For this reason such charts are usually scaled by means of a steel rule or the like which is laid upon the face of the chart to measure linear distances between certain parts of the record, these distances being compared with tabular values of displacement and pressure.

Pressure recording devices of this type usually produce a chart or record in which a continuously moving lateral time base is provided by means of clockwork and the pressure values are displaced longitudinally from a zero or base line in a series of steps produced by the pressure responsive element of the recorder, which may be a spring-restrained piston or the like. The distance between the various steps and the base line representing zero or atmospheric pressure is a function of the force responsive characteristic of the spring and piston, if one is used, and gives a measure of the pressures to which the device has been subjected at the times indicated by the lateral displacement of the record.

This invention comprehends broadly a means for holding such a strip chart in a predetermined position, in combination with a cursor, which may or may not be a magnifier, movable along an accurately threaded rod or shaft, the latter being geared to a revolution indicator or counter so calibrated that motion of the cursor across the chart between predetermined markings thereon may be translated through rotation of the shaft and operation of the revolution counter to give a direct reading on the dials of the latter to a high degree of accuracy.

It is an object of this invention to provide a conveniently operable means for measuring linear distances on flat strip charts of the type produced by pressure recorder for use in deep wells.

Another object is to provide a device of this type in which the means for maintaining the chart in predetermined relationship to the cursor and shaft are adjustable angularly as well as longitudinally.

Another object is to provide a geared measuring device that may be readily aligned with markings on a chart and provided with a cursor which can be rapidly moved to other linearly spaced markings on the same chart, in combination with a means for indicating directly in predetermined units the linear distances between said markings.

These and other objects and advantages of this invention will be further apparent from the following description and from the drawing which illustrates a preferred embodiment of this invention.

In the drawing, Figure 1 is a plan view of this device with a chart in position to be measured.

Figure 1:
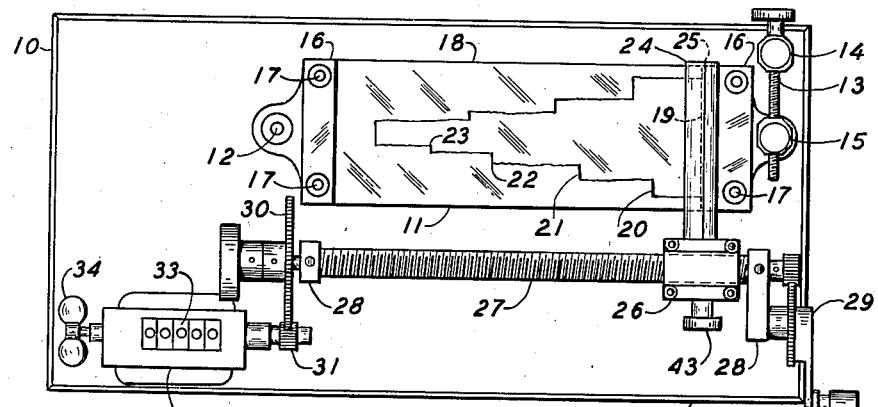
Figure 2:
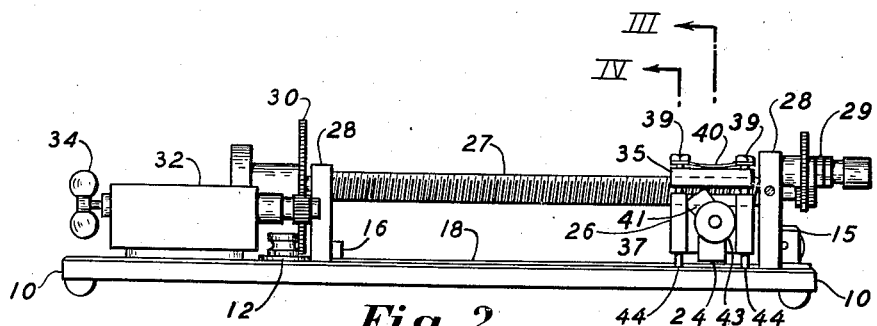
Figure 2 is a front elevational view of the device shown in Figure 1.

By referring to the drawing and particularly to Figure 1, reference numeral 10 represents a flat base, preferably of a hard material, such as metal or synthetic plastic. At one side of base 10 is the chart holder generally designated 11 which is pivoted at 12 to have a slight degree of angular motion. At the opposite end of chart holder 11 is an angular adjustment screw 13 secured to post 14 and engaging a threaded boss 15 at the opposite end of chart holder 11 from its pivoted support 12. Each end of chart holder 15 is provided with a clamping bar 16 and threaded nuts 17 so that the chart 18 may be placed beneath bars 16 and securely clamped to the holder 11. Chart 18 may be of paper or thin metal and is generally marked with a base line 19 representing zero or atmospheric pressure. The record on the chart is generally in a series of steps 20, 21, 22, 23, etc., each one representing the pressure condition in a certain depth in a well, for example, or a certain condition of operation of a well. Because of the varying force characteristics of the springs used in these pressure recorders, it is not feasible to calibrate the chart previous to its use with lines representing pressure values and spaced by predetermined intervals from the base line 19. Thus the problem is to measure or scale the distances 20, 21, 22, 23, etc. from the base line and then convert them by means of the spring calibration chart into pressure values.

In the example shown, the cursor 24 which is adapted to be moved across the face of chart 18 to measure the linear distances between base line 19 and steps 20, 21, 22, 23, etc. is illustrated as being displaced slightly below base line 19. Cursor 24 is preferably but not necessarily made of a transparent material, such as the methyl methacrylate polymer "Lucite," and is provided across its bottom face with a transverse index line 25 which may be aligned with base line 19 or with steps 20, 21, 22, 23, etc. on chart 18. The upper surface of cursor 24 may be made convex to give a desired degree of magnification, as shown. A carriage 26 for cursor 24 is mounted upon an elongated threaded rod or shaft 27 parallel to base 10 and supported between journals 28, and desirably but not necessarily provided at one end with a motion multiplying means 29. One end of shaft 27 is provided with motion multiplying gears 30 and 31, the latter being supported upon the shaft of a revolution counter 32. By suitably proportioning the pitch of the threads on shaft 27, the respective diameters of gears 30 and 31 and the internal gearing of revolution counter 32, according to well known mathematical principles, the figures shown on the dials 33 of revolution counter 32 may be made to read in inches, tenths, and thousandths or any other desired linear or arbitrary units. Preferably revolution counter 32 is of the reset type provided with a wing nut 34 so that the dials 33 may be reset to zero at any time. Also it is quite desirable that revolution counter 32 is adapted to add in one direction and subtract in the other direction of rotation of its shaft.

Figure 3:
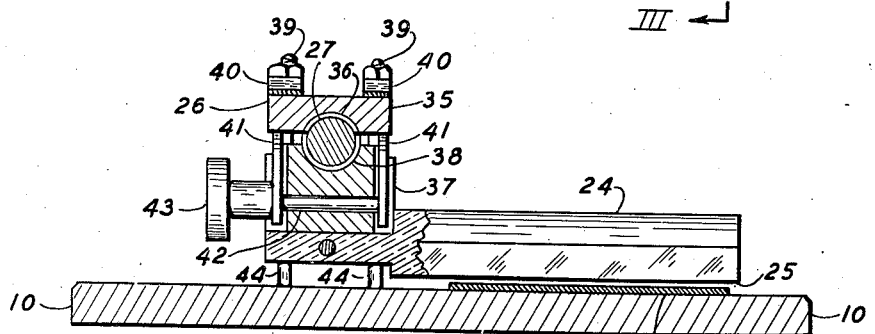
Figure 3 is an enlarged transverse vertical sectional view on line III—III of Figure 2.

It is desirable that carriage 26 be movable longitudinally with regard to threaded shaft 27 without rotating the latter. In this example carriage 26 (Figure 3) is preferably made in two parts, the upper part having a member 35 threaded at 36 to engage the threads on shaft 27. The lower part 37 of carriage 26 is provided with a smooth or unthreaded semi-circular groove 38 which will align carriage 26 with shaft 27 but will not positively engage the threads on the latter. Parts 35 and 37 of carriage 26 are aligned or pinned together by means of four screws 39 which are slidably received in upper member 35 and are threadedly engaged in lower member 37. Resilient means, such as flat springs 40, are provided above upper member 35 and the heads of screws 39 so that the upper member will normally be urged downwardly against threaded shaft 27 to engage the latter.

Figure 4:
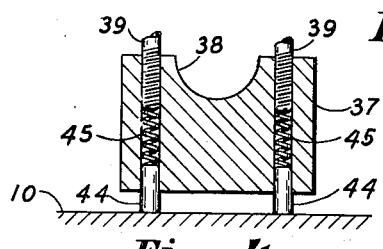
Figure 4 is an enlarged detail transverse vertical sectional view on line IV—IV of Figure 2.

In order selectively to release carriage 26 from its threaded engagement with shaft 27, a pair of cams 41 are supported by a transverse shaft 42 extending through lower member 37 and provided with a knob 43 (Figure 3), so arranged that, when knob 43 is rotated, cams 41 will engage the lower face of upper member 35 on each side of shaft 27 to lift member 35 out of engagement with the threads of shaft 27. Lower member 37 is kept in contact with shaft 27 by means of pins 44 (Figure 4) which are urged downwardly by means of springs 45 to engage base 10 and exert an upward reactive force against 37. This construction permits the operator to release the threaded connection just described and to slide carriage 26 to any desired point over the face of chart 18 to align the index line 25 with a desired mark or record on chart 18, for example, base line 19, and then to engage the carriage 26 with the threaded shaft 27 at that point by turning knob 43 to lower cams 41 from their engagement with the bottom face of member 35.

In operation, chart 18 is secured beneath clamping bars 16 and the entire chart holder 11 is adjusted by means of screw 13 so that base line 19 is parallel to index 25 on cursor 24. Carriage 26 is then moved so that index 25 is exactly aligned with base line 19 and the reset 34 of revolution counter 32 is turned so that all of dials 33 indicate zero. Knob 43 is turned so that the upper member 35 of carriage 26 engages the threaded shaft 27. Carriage 26 is then moved across the face of chart 18 by rotating shaft 27, for example, by means of the motion multiplying means 29. When index 25 on cursor 24 is exactly aligned with steps 20 or 21 or 22 or 23, etc., the dials 33 of revolution counter 32 will indicate the linear distance through which the cursor has been moved, and if the mathematical relationships of threaded shaft 27, gears 30 and 31 and the internal gearing of revolution counter 32 have been properly chosen, the linear distance will be expressed in the desired units on dials 33.

This invention has been found to be much more accurate in operation and adapted to be used continuously through a working day with much less effort on the part of the operators than the previously used procedures of scaling these distances with steel scales using magnifiers and the like, to obtain accurate readings of the linear distances involved. Although a single example of means embodying this invention has been illustrated and described, it is obvious that numerous modifications and changes could be made without departing from the invention, and all such modifications and changes that come within the scope of the appended claim are embraced thereby.

I claim:

Apparatus for measuring a succession of linear distances on a curve such as a pressure-time chart, said curve having a succession of critical points spaced at unknown distances from a base line, comprising a base, pivoted means on said base for holding said chart in a predetermined aligned position, a movable cursor adapted to be positioned closely adjacent the surface of the chart and provided with an index to be aligned with critical markings thereon, a rotatable threaded shaft on said base, a carriage threadedly mounted on said shaft and carrying said cursor to move the latter across said chart when said shaft is rotated, means on said carriage engaging said base to space said cursor above said base and said chart, means on said carriage for selectively connecting it to said threaded shaft and disconnecting it therefrom, and a rotation indicator for said shaft which will add to its total upon rotation in one direction and subtract from its total upon rotation in the opposite direction, so calibrated and arranged that the linear distances of said critical points on said chart will be accumulated on said rotation indicator during motion of said cursor from said base line, and subtracted during motion of said cursor toward said base line.

HUGH B. WEBSTER.